United States Patent
Trepess et al.

(10) Patent No.: US 7,627,820 B2
(45) Date of Patent: Dec. 1, 2009

(54) INFORMATION STORAGE AND RETRIEVAL

(75) Inventors: David William Trepess, Basingstoke (GB); Jonathan Richard Thorpe, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 798 days.

(21) Appl. No.: 10/664,299

(22) Filed: Sep. 17, 2003

(65) Prior Publication Data

US 2004/0056886 A1    Mar. 25, 2004

(30) Foreign Application Priority Data

Sep. 19, 2002    (GB)    ................... 0221774.3

(51) Int. Cl.
  G06F 3/00    (2006.01)
  G06F 7/00    (2006.01)
  G06F 17/00    (2006.01)
(52) U.S. Cl. ............................. 715/700; 715/968; 707/3
(58) Field of Classification Search ................. 715/700, 715/968; 707/3
  See application file for complete search history.

(56) References Cited

U.S. PATENT DOCUMENTS

| | | | |
|---|---|---|---|
| 5,809,490 A * | 9/1998 | Guiver et al. ................. | 706/16 |
| 6,181,838 B1 | 1/2001 | Knowlton | |
| 6,948,123 B2 * | 9/2005 | Endou et al. ................. | 715/700 |

FOREIGN PATENT DOCUMENTS

| | | |
|---|---|---|
| JP | 2002-041545 | 2/2002 |
| JP | 2002-041571 | 2/2002 |
| WO | WO 01/75640 | 10/2001 |
| WO | WO 02/27508 | 4/2002 |
| WO | WO 02/27508 A1 * | 4/2002 |
| WO | WO 02/41190 | 5/2002 |

OTHER PUBLICATIONS

Motonobu Hattori, Hiroya Arisumi, Hiroshi Ito Sequential Learning for SOM Associative Memory With Map Reconstruction Lecture Notes in Computer Science Vol. 2130/2001 pp.477-484.*

(Continued)

*Primary Examiner*—William L Bashore
*Assistant Examiner*—Andrea N Long
(74) *Attorney, Agent, or Firm*—Oblon, Spivak, McClelland, Maier & Neustadt, L.L.P.

(57) ABSTRACT

An information retrieval system in which a set of distinct information items map to respective nodes in an array of nodes by mutual similarity of the information items, so that similar information items map to nodes at similar positions in the array of nodes comprises:

a graphical user interface for displaying a representation of at least some of the nodes as a two-dimensional display array of display points within a display area on a user display;

a user control for defining a two-dimensional region of the display area; and a detector for detecting those display points lying within the two-dimensional region of the display area;

the graphical user interface also displaying a list of data representing information items, being those information items mapped onto nodes corresponding to display points displayed within the two-dimensional region of the display area.

17 Claims, 9 Drawing Sheets

OTHER PUBLICATIONS

Jan Jockusch, Helge Ritter An Instantaneous Topologoical Mapping Model for Correlated Stimuli Copyright 1999 IEEE pp. 529-534.*

Teuvo Kohonen, Smauel Kaski, Krista Lagus, Jarkko Salojarvi, Jukka Honkela, Vesa Paatero, Antti Saarela Self Organization of a Massive Document Collection IEEE Transactions on Nueral Networks vol. 11, No. 3, May 2000 pp. 574-585.*

Alahakoon, D., Halgamuge, S.K. Dynamic Self-Organizing Maps with Controlled Growth for Knowledge Discovery IEEE Transactions on Neural Networks, vol. 11, No. 3, May 2000, pp. 601-614.*

Xia Lin, Dagobert Soergel, Gary Marchionini: "A self-organizing semantic map for information retrieval" Proceedings of the 14th Annual International ACM SIGIR Conference OW Research and Development in Information Retrieval, Sep. 1991, pp. 262-269, XP002259641 Chicago, Illinois, USA ISBN: 0-89791-448-1 Section 4. "A prototype system".

Kohonen Teuvo: "Analysis of processes and large data sets by a self-organizing method" Proceedings of the Second International Conference on Intelligent Processing and Manufactoring of Materials, Honolulu, HI, USA ISBN: 0-7803-5489-3.

"Mozzy Star", www.kartoo.com, Mar. 18, 2003, p. 1.

"Searching for Perfection", Anita Hamilton, Time.com, Aug. 5, 2002, pp. 1-4.

"Self Organization of a Massive Document Collection", Kohonen et al., IEEE Transactions on Neural Networks, vol. 11, No. 3, May 3, 2000, pp. 574-585.

"Dimensionality Reduction by Random Mapping: Fast Similarity Computation for Clustering", Kaski, Proc IJCNN, pp. 413-418, 1998.

Andreas Rauber, et al., "An Old-Fashioned approach to Web Search Results Visualization", Department of Software Technology, pp. 615 to 619.

* cited by examiner

INFORMATION STORAGE AND RETRIEVAL

BACKGROUND OF THE INVENTION

1. Field of the Invention

This invention relates to information storage and retrieval.

There are many established systems for locating information (e.g. documents, images, emails, patents, internet content or media content such as audio/video content) by searching under keywords. Examples include internet search "engines" such as those provided by "Google"™ or "Yahoo"™ where a search carried out by keyword leads to a list of results which are ranked by the search engine in order of perceived relevance.

However, in a system encompassing a large amount of content, often referred to as a massive content collection, it can be difficult to formulate effective search queries to give a relatively short list of search "hits". For example, at the time of preparing the present application, a Google search on the keywords "massive document collection" drew 243000 hits. This number of hits would be expected to grow if the search were repeated later, as the amount of content stored across the internet generally increases with time. Reviewing such a list of hits can be prohibitively time-consuming.

In general, some reasons why massive content collections are not well utilised are:
- a user doesn't know that relevant content exists
- a user knows that relevant content exists but does not know where it can be located
- a user knows that content exists but does not know it is relevant
- a user knows that relevant content exists and how to find it, but finding the content takes a long time The paper "Self Organisation of a Massive Document Collection", Kohonen et al, IEEE Transactions on Neural Networks, Vol 11, No. 3, May 2000, pages 574-585 discloses a technique using so-called "self-organising maps" (SOMs). These make use of so-called unsupervised self-learning neural network algorithms in which "feature vectors" representing properties of each document are mapped onto nodes of a SOM.

In the Kohonen et al paper, a first step is to pre-process the document text, and then a feature vector is derived from each pre-processed document. In one form, this may be a histogram showing the frequencies of occurrence of each of a large dictionary of words. Each data value (i.e. each frequency of occurrence of a respective dictionary word) in the histogram becomes a value in an n-value vector, where n is the total number of candidate words in the dictionary (43222 in the example described in this paper). Weighting may be applied to the n vector values, perhaps to stress the increased relevance or improved differentiation of certain words.

The n-value vectors are then mapped onto smaller dimensional vectors (i.e. vectors having a number of values m (500 in the example in the paper) which is substantially less than n. This is achieved by multiplying the vector by an (n×m) "projection matrix" formed of an array of random numbers. This technique has been shown to generate vectors of smaller dimension where any two reduced-dimension vectors have much the same vector dot product as the two respective input vectors. This vector mapping process is described in the paper "Dimensionality Reduction by Random Mapping: Fast Similarity Computation for Clustering", Kaski, Proc IJCNN, pages 413-418, 1998.

The reduced dimension vectors are then mapped onto nodes (otherwise called neurons) on the SOM by a process of multiplying each vector by a "model" (another vector). The models are produced by a learning process which automatically orders them by mutual similarity onto the SOM, which is generally represented as a two-dimensional grid of nodes. This is a non-trivial process which took Kohonen et al six weeks on a six-processor computer having 800 MB of memory, for a document database of just under seven million documents. Finally the grid of nodes forming the SOM is displayed, with the user being able to zoom into regions of the map and select a node, which causes the user interface to offer a link to an internet page containing the document linked to that node.

2. Description of the Prior Art

This invention provides an information retrieval system in which a set of distinct information items map to respective nodes in an array of nodes by mutual similarity of the information items, so that similar information items map to nodes at similar positions in the array of nodes; the system comprising:

a graphical user interface for displaying a representation of at least some of the nodes as a two-dimensional display array of display points within a display area on a user display;

a user control for defining a two-dimensional region of the display area; and a detector for detecting those display points lying within the two-dimensional region of the display area;

the graphical user interface also displaying a list of data representing information items, being those information items mapped onto nodes corresponding to display points displayed within the two-dimensional region of the display area.

The skilled man will realise that in the normal usage of the word "list", the "data representing information items" could be the item itself, if it is of a size and nature appropriate for full display, or could be data indicative of the item.

The invention also provides an information storage system in which a set of distinct information items are processed so as to map to respective nodes in an array of nodes by mutual similarity of the information items, such that similar information items map to nodes at similar positions in the array of nodes; the system comprising:

means for generating a feature vector derived from each information item, the feature vector for an information item representing a set of frequencies of occurrence, within that information item, of each of a group of information features; and means for mapping each feature vector to a node in the array of nodes, the mapping between information items and nodes in the array including a dither component so that substantially identical information items tend to map to closely spaced but different nodes in the array.

SUMMARY OF THE INVENTION

The invention builds on the processes described in the Kohonen et al paper by providing a user interface conveniently allowing the user to associate displayed points on the screen with information items in a list of items, while allowing the user to distinguish conveniently between similar information items.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

Figures 4A, 4B:
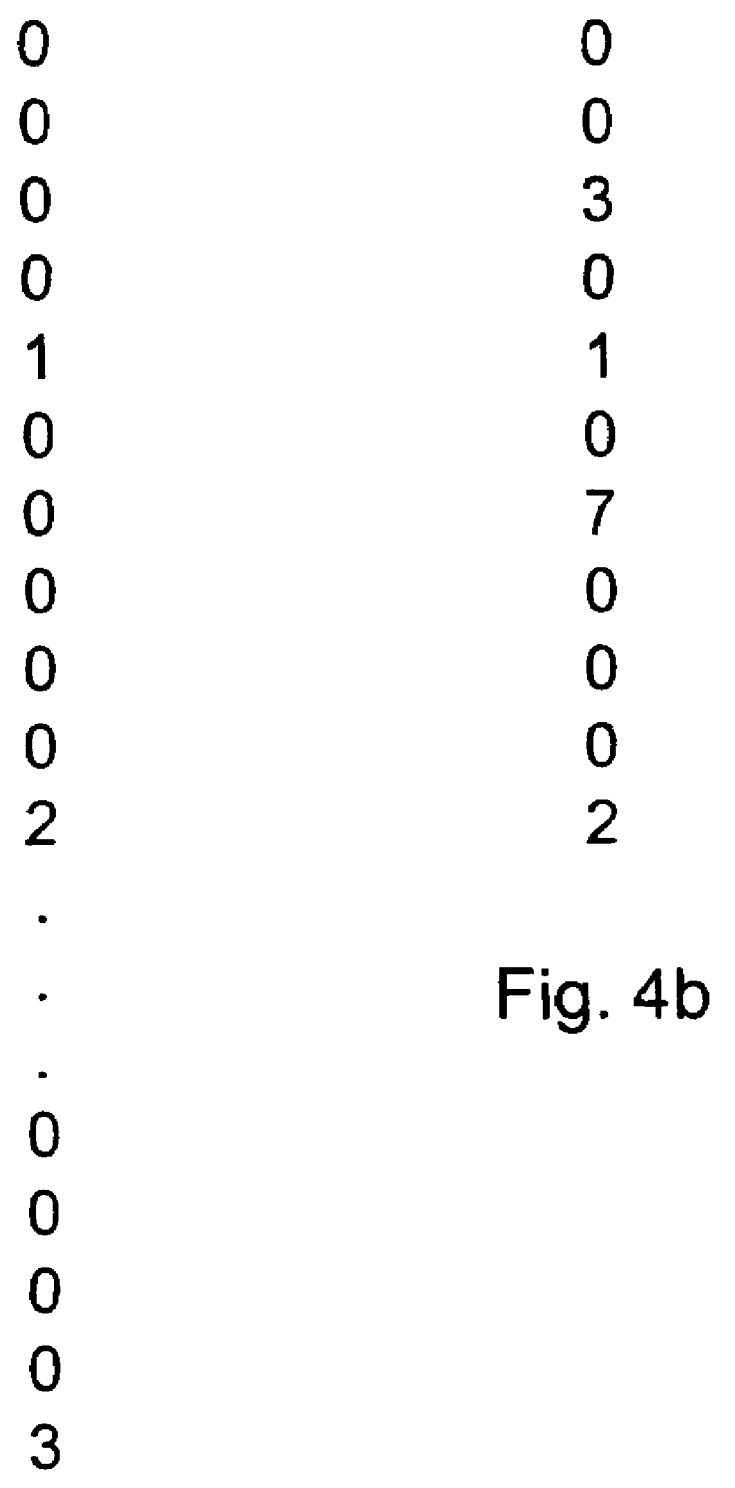

FIG. 4a schematically illustrates a raw feature vector;

FIG. 4b schematically illustrates a reduced feature vector;

DESCRIPTION OF THE PREFERRED EMBODIMENTS

Figure 1:
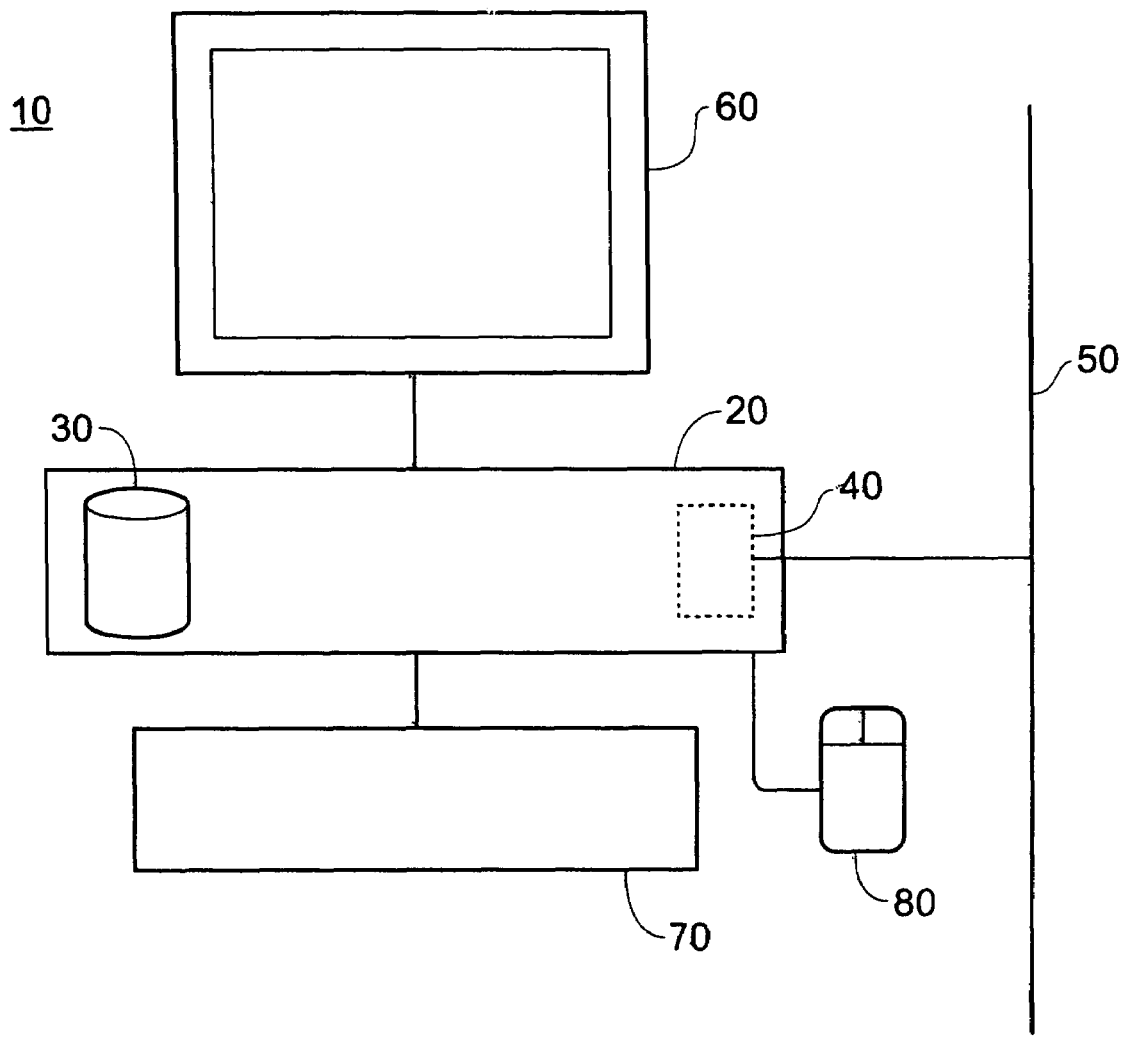
FIG. 1 schematically illustrates an information storage and retrieval system.

FIG. 1 is a schematic diagram of an information storage and retrieval system based around a general-purpose computer 10 having a processor unit 20 including disk storage 30 for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown) or a pre-installation on the disk storage 30.

The storage system operates in two general modes of operation. In a first mode, a set of information items (e.g. textual information items) is assembled on the disk storage 30 or on a network disk drive connected via the network 50 and is sorted and indexed ready for a searching operation. The second mode of operation is the actual searching against the indexed and sorted data.

The embodiments are applicable to many types of information items. A non-exhaustive list of appropriate types of information includes patents, video material, emails, presentations, internet content, broadcast content, business reports, audio material, graphics and clipart, photographs and the like, or combinations or mixtures of any of these. In the present description, reference will be made to textual information items, or at least information items having a textual content or association. So, for example, a piece of broadcast content such as audio and/or video material may have associated "MetaData" defining that material in textual terms.

The information items are loaded onto the disk storage 30 in a conventional manner. Preferably, they are stored as part of a database structure which allows for easier retrieval and indexing of the items, but this is not essential. Once the information and items have been so stored, the process used to arrange them for searching is shown schematically in FIG. 2.

It will be appreciated that the indexed information data need not be stored on the local disk drive 30. The data could be stored on a remote drive connected to the system 10 via the network 50. Alternatively, the information may be stored in a distributed manner, for example at various sites across the internet. If the information is stored at different internet or network sites, a second level of information storage could be used to store locally a "link" (e.g. a URL) to the remote information, perhaps with an associated summary, abstract or MetaData associated with that link. So, the remotely held information would not be accessed unless the user selected the relevant link (e.g. from the results list 260 to be described below), although for the purposes of the technical description which follows, the remotely held information, or the abstract/summary/MetaData, or the link/URL could be considered as the "information item".

In other words, a formal definition of the "information item" is an item from which a feature vector is derived and processed (see below) to provide a mapping to the SOM. The data shown in the results list 260 (see below) may be the information item itself (if it is held locally and is short enough for convenient display) or may be data representing and/or pointing to the information item, such as one or more of MetaData, a URL, an abstract, a set of key words, a representative key stamp image or the like. This is inherent in the operation "list" which often, though not always, involves listing data representing a set of items.

In a further example, the information items could be stored across a networked work group, such as a research team or a legal firm. A hybrid approach might involve some information items stored locally and/or some information items stored across a local area network and/or some information items stored across a wide area network. In this case, the system could be useful in locating similar work by others, for example in a large multi-national research and development organisation, similar research work would tend to be mapped to similar output nodes in the SOM (see below). Or, if a new television programme is being planned, the present technique could be used to check for its originality by detecting previous programmes having similar content.

It will also be appreciated that the system 10 of FIG. 1 is but one example of possible systems which could use the indexed information items. Although it is envisaged that the initial (indexing) phase would be carried out by a reasonably powerful computer, most likely by a non-portable computer, the later phase of accessing the information could be carried out at a portable machine such as a "personal digital assistant" (a term for a data processing device with display and user input devices, which generally fits in one hand), a portable computer such as a laptop computer, or even devices such as a mobile telephone, a video editing apparatus or a video camera. In general, practically any device having a display could be used for the information-accessing phase of operation.

The processes are not limited to particular numbers of information items.

Figure 2:
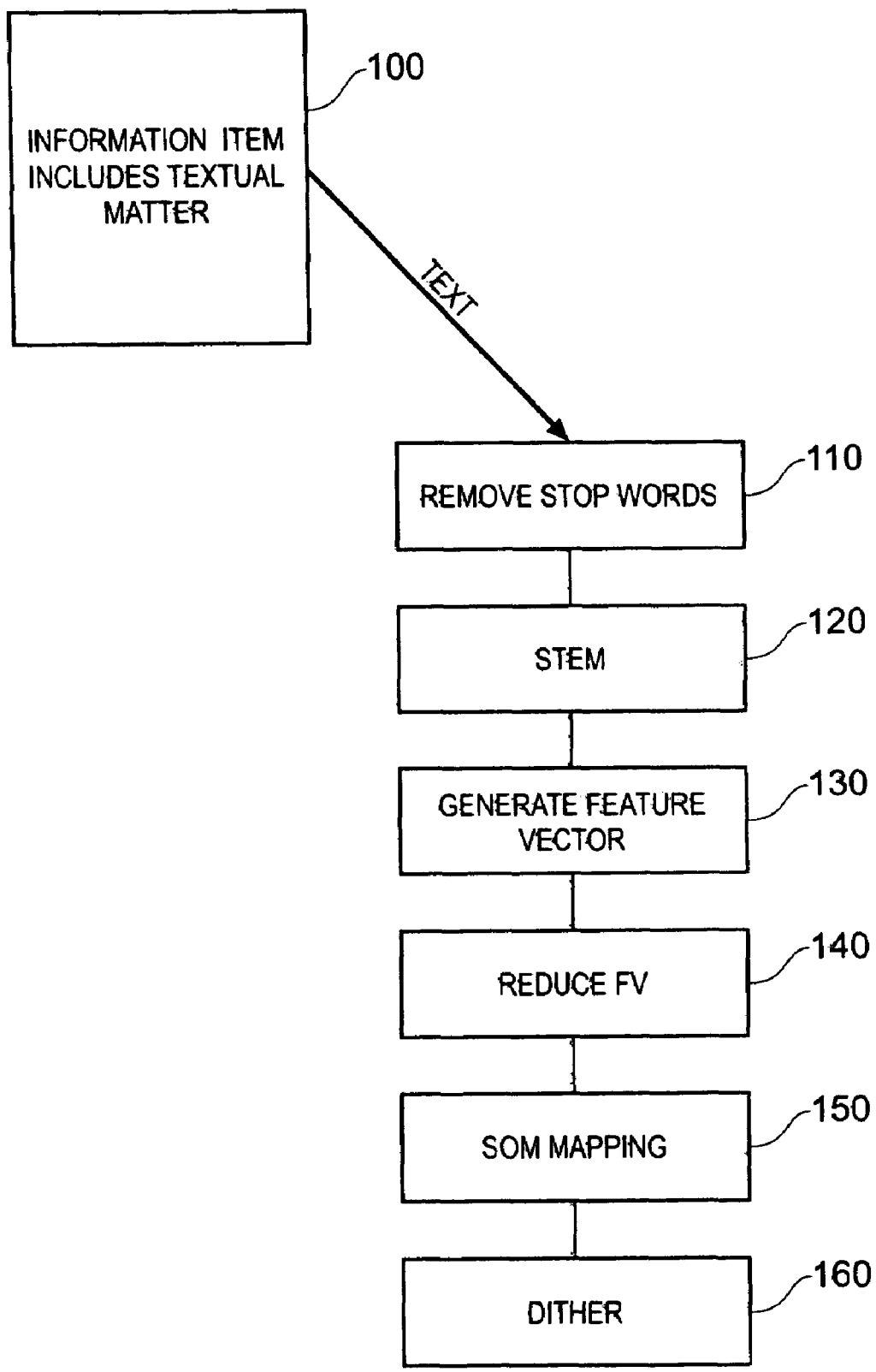
FIG. 2 is a schematic flow chart showing the generation of a self-organising map (SOM)

The process of generating a self-organising map (SOM) representation of the information items will now be described with reference to FIGS. 2 to 6. FIG. 2 is a schematic flow chart illustrating a so-called "feature extraction" process followed by an SOM mapping process.

Feature extraction is the process of transforming raw data into an abstract representation. These abstract representations can then be used for processes such as pattern classification, clustering and recognition. In this process, a so-called "feature vector" is generated, which is an abstract representation of the frequency of terms used within a document.

The process of forming the visualisation through creating feature vectors includes:

Create "document database dictionary" of terms

Create "term frequency histograms" for each individual document based on the "document database dictionary"

Reduce the dimension of the "term frequency histogram" using random mapping

Create a 2-dimensional visualisation of the information space.

Considering these steps in more detail, each document (information item) 100 is opened in turn. At a step 110, all "stop words" are removed from the document. Stop-words are extremely common words on a pre-prepared list, such as "a", "the", "however", "about", "and", and "the". Because these words are extremely common they are likely, on average, to appear with similar frequency in all documents of a sufficient length. For this reason they serve little purpose in trying to characterise the content of a particular document and should therefore be removed.

After removing stop-words, the remaining words are stemmed at a step 120, which involves finding the common stem of a word's variants. For example the words "thrower", "throws", and "throwing" have the common stem of "throw".

A "dictionary" of stemmed words appearing in the documents (excluding the "stop" words) is maintained. As a word is newly encountered, it is added to the dictionary, and a running count of the number of times the word has appeared in the whole document collection (set of information items) is also recorded.

The result is a list of terms used in all the documents in the set, along with the frequency with which those terms occur. Words that occur with too high or too low a frequency are discounted, which is to say that they are removed from the dictionary and do not take part in the analysis which follows. Words with too low a frequency may be misspellings, made up, or not relevant to the domain represented by the document set. Words that occur with too high a frequency are less appropriate for distinguishing documents within the set. For example, the term "News" is used in about one third of all documents in a test set of broadcast-related documents, whereas the word "football" is used in only about 2% of documents in the test set. Therefore "football" can be assumed to be a better term for characterising the content of a document than "News". Conversely, the word "fottball" (a misspelling of "football") appears only once in the entire set of documents, and so is discarded for having too low an occurrence. Such words may be defined as those having a frequency of occurrence which is lower than two standard deviations less than the mean frequency of occurrence, or which is higher than two standard deviations above the mean frequency of occurrence.

A feature vector is then generated at a step 130.

Figure 3A:
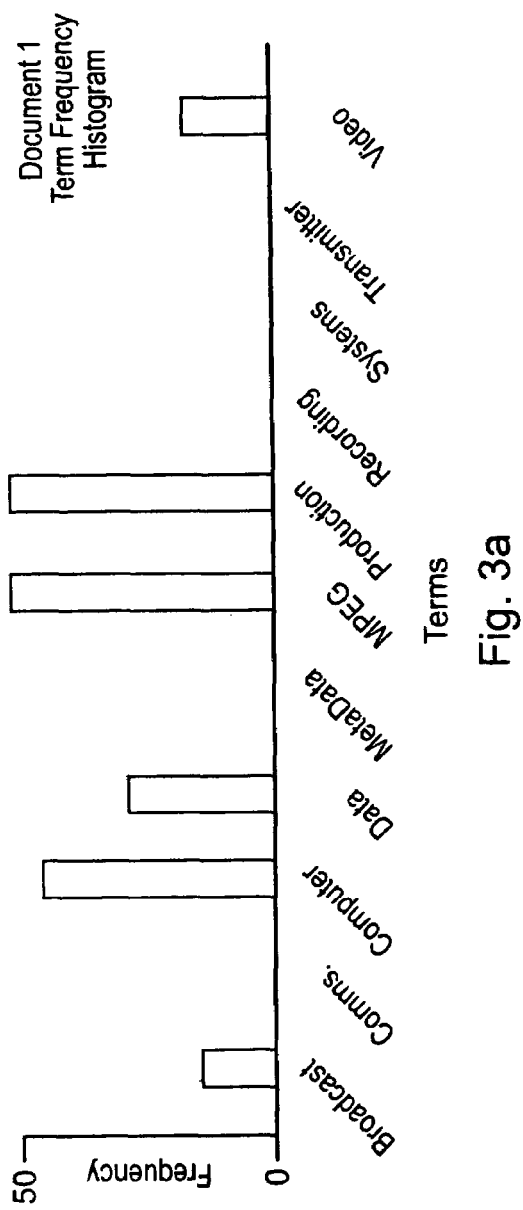
FIGS. 3a and 3b schematically illustrate term frequency histograms.
Figure 3B:
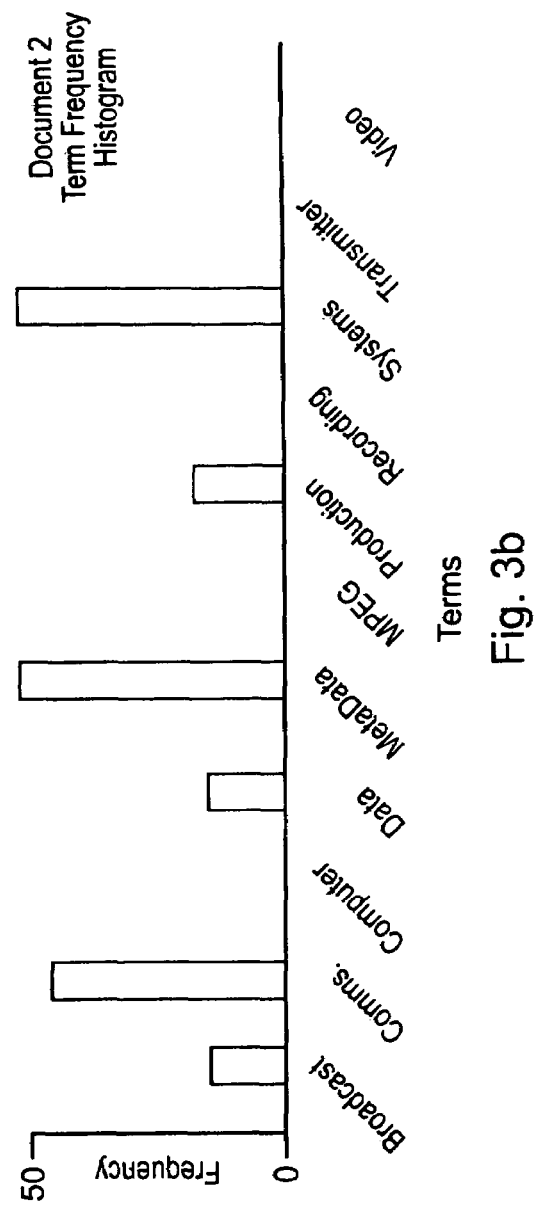

To do this, a term frequency histogram is generated for each document in the set. A term frequency histogram is constructed by counting the number of times words present in the dictionary (pertaining to that document set) occur within an individual document. The majority of the terms in the dictionary will not be present in a single document, and so these terms will have a frequency of zero. Schematic examples of term frequency histograms for two different documents are shown in FIGS. 3a and 3b.

It can be seen from this example how the histograms characterise the content of the documents. By inspecting the examples it is seen that document 1 has more occurrences of the terms "MPEG" and "Video" than document 2, which itself has more occurrences of the term "MetaData". Many of the entries in the histogram are zero as the corresponding words are not present in the document.

In a real example, the actual term frequency histograms have a very much larger number of terms in them than the example. Typically a histogram may plot the frequency. of over 50000 different terms, giving the histogram a dimension of over 50000. The dimension of this histogram needs to be reduced considerably if it is to be of use in building an SOM information space.

Each entry in the term frequency histogram is used as a corresponding value in a feature vector representing that document. The result of this process is a (50000×1) vector containing the frequency of all terms specified by the dictionary for each document in the document collection. The vector may be referred to as "sparse" since most of the values will typically be zero, with most of the others typically being a very low number such as 1.

The size of the feature vector, and so the dimension of the term frequency histogram, is reduced at a step 140. Two methods are proposed for the process of reducing the dimension of the histogram.

i) Random Mapping—a technique by which the histogram is multiplied by a matrix of random numbers. This is a computationally cheap process.

ii) Latent Semantic Indexing—a technique whereby the dimension of the histogram is reduced by looking for groups of terms that have a high probability of occurring simultaneously in documents. These groups of words can then be reduced to a single parameter. This is a computationally expensive process.

The method selected for reducing the dimension of the term frequency histogram in the present embodiment is "random mapping", as explained in detail in the Kaski paper referred to above. Random mapping succeeds in reducing the dimension of the histogram by multiplying it by a matrix of random numbers.

As mentioned above, the "raw" feature vector (shown schematically in FIG. 4a) is typically a sparse vector with a size in the region of 50000 values. This can be reduced to a size of about 200 (see schematic FIG. 4b) and still preserve the relative characteristics of the feature vector, that is to say, its relationship such as relative angle (vector dot product) with other similarly processed feature vectors. This works because although the number of orthogonal vectors of a particular dimension is limited, the number of nearly orthogonal vectors is very much larger.

In fact as the dimension of the vector increases any given set of randomly generated vectors are nearly orthogonal to each other. This property means that the relative direction of vectors multiplied by this matrix of random numbers will be preserved. This can be demonstrated by showing the similarity of vectors before and after random mapping by looking at their dot product.

It can be shown experimentally that reducing a sparse vector from 50000 values to 200 values preserves their relative similarities. However, this mapping is not perfect, but suffices for the purposes of characterising the content of a document in a compact way.

Figure 5:
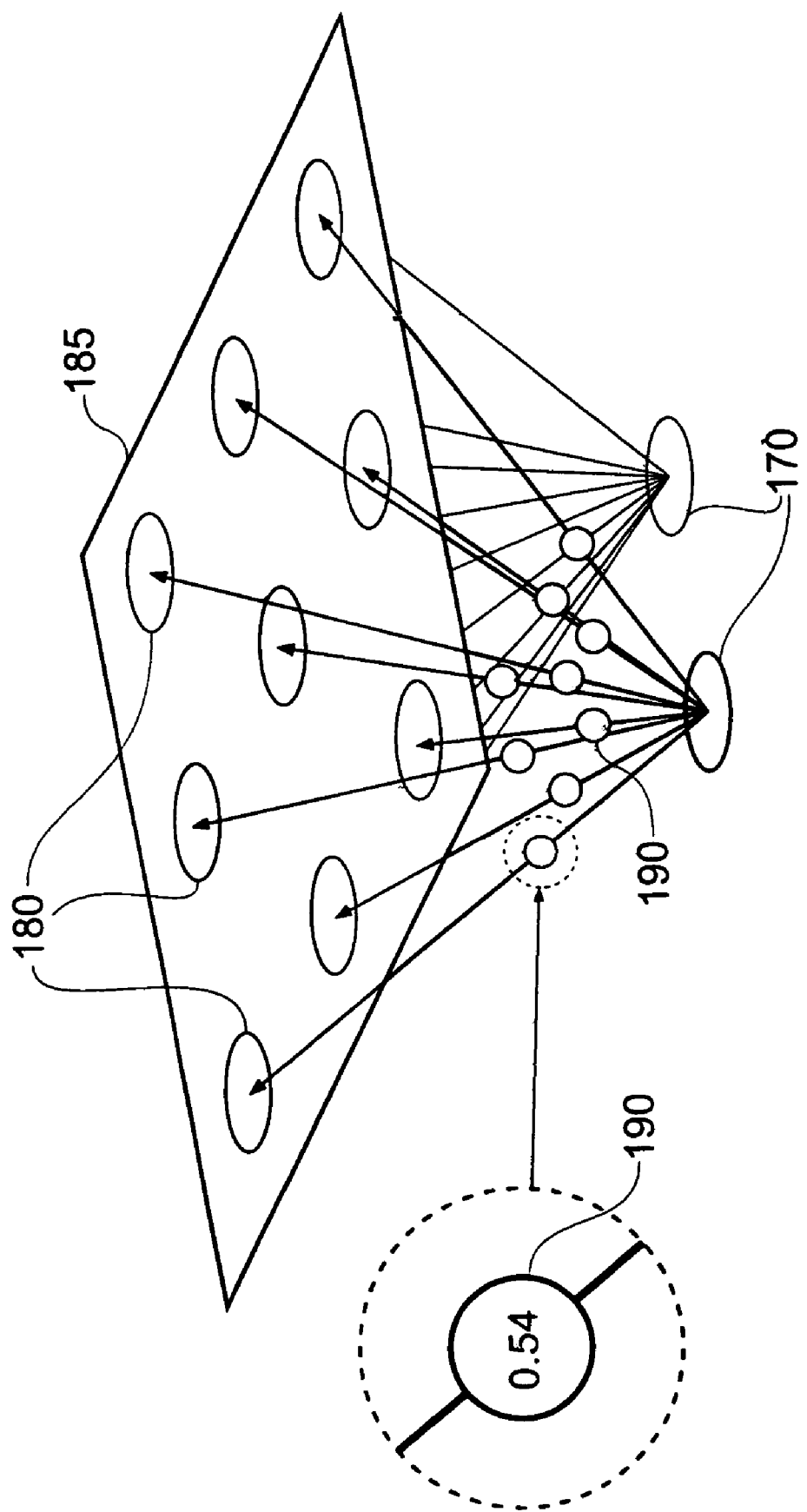
FIG. 5 schematically illustrates an SOM.

Once feature vectors have been generated for the document collection, thus defining the collection's information space, they are projected into a two-dimensional SOM at a step 150 to create a semantic map. The following section explains the process of mapping to 2-D by clustering the feature vectors using a Kohonen self-organising map. Reference is also made to FIG. 5.

A Kohonen Self-Organising map is used to cluster and organise the feature vectors that have been generated for each of the documents.

A self-organising map consists of input nodes 170 and output nodes 180 in a two-dimensional array or grid of nodes illustrated as a two-dimensional plane 185. There are as many input nodes as there are values in the feature vectors being used to train the map. Each of the output nodes on the map is connected to the input nodes by weighted connections 190 (one weight per connection).

Initially each of these weights is set to a random value, and then, through an iterative process, the weights are "trained". The map is trained by presenting each feature vector to the input nodes of the map. The "closest" output node is calculated by computing the Euclidean distance between the input vector and weights of each of the output nodes.

The closest node is designated the "winner" and the weights of this node are trained by slightly changing the values of the weights so that they move "closer" to the input vector. In addition to the winning node, the nodes in the neighbourhood of the winning node are also trained, and moved slightly closer to the input vector.

It is this process of training not just the weights of a single node, but the weights of a region of nodes on the map, that allow the map, once trained, to preserve much of the topology of the input space in the 2-D map of nodes.

Once the map is trained, each of the documents can be presented to the map to see which of the output nodes is closest to the input feature vector for that document. It is unlikely that the weights will be identical to the feature vector, and the Euclidean distance between a feature vector and its nearest node on the map is known as its "quantisation error".

By presenting the feature vector for each document to the map to see where it lies yields and x, y map position for each document. These x, y positions when put in a look up table along with a document ID can be used to visualise the relationship between documents.

Finally, a dither component is added at a step 160, which will be described with reference to FIG. 6 below.

A potential problem with the process described above is that two identical, or substantially identical, information items may be mapped to the same node in the array of nodes of the SOM. This does not cause a difficulty in the handling of the data, but does not help with the visualisation of the data on display screen (to be described below). In particular, when the data is visualised on a display screen, it has been recognised that it would be useful for multiple very similar items to be distinguishable over a single item at a particular node. Therefore, a "dither" component is added to the node position to which each information item is mapped. The dither component is a random addition of up to ±½ of the node separation. So, referring to FIG. 6, an information item for which the mapping process selects an output node 200 has a dither component added so that it in fact may be mapped to any node position within the area 210 bounded by dotted lines on FIG. 6.

Figure 6:
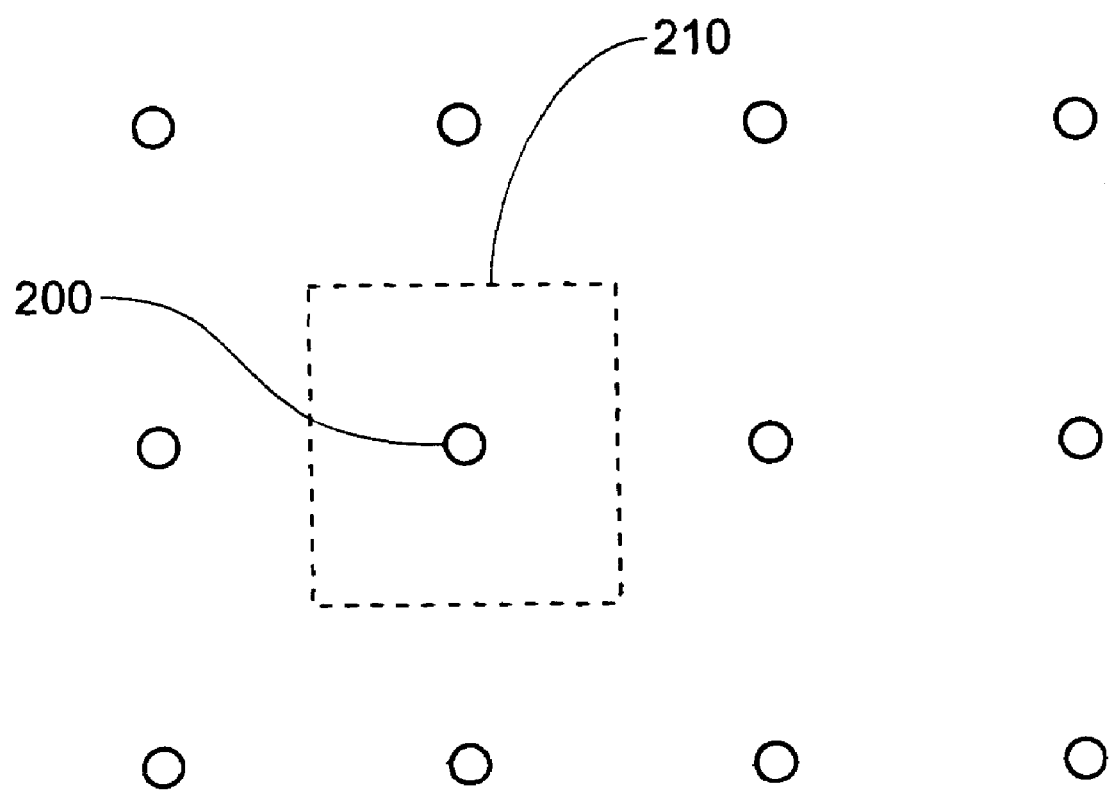
FIG. 6 schematically illustrates a dither process.

So, the information items can be considered to map to positions on the plane of FIG. 6 at node positions other than the "output nodes" of the SOM process.

An alternative approach might be to use a much higher density of "output nodes" in the SOM mapping process described above. This would not provide any distinction between absolutely identical information items, but may allow almost, but not completely, identical information items to map to different but closely spaced output nodes.

Figure 7:
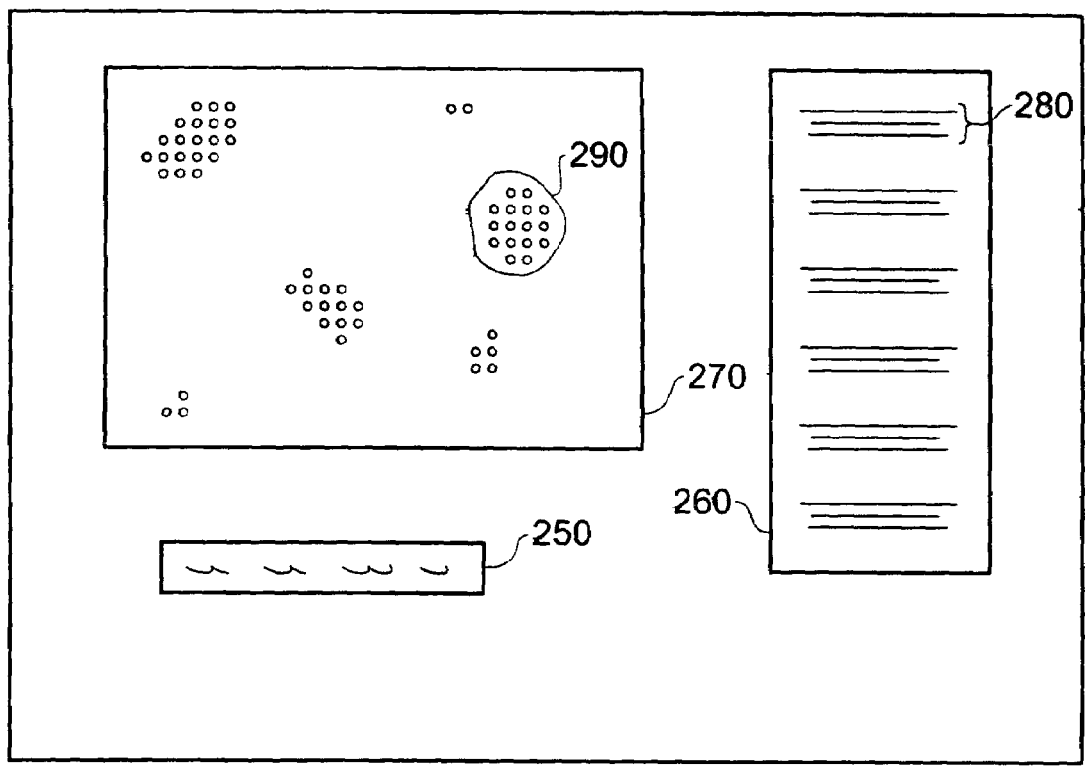
FIGS. 7 to 9 schematically illustrate display screens providing a user interface to access information represented by the SOM.

FIG. 7 schematically illustrates a display on the display screen 60 in which data sorted into an SOM is graphically illustrated for use in a searching operation. The display shows a search enquiry 250, a results list 260 and an SOM display area 270.

In operation, the user types a key word search enquiry into the enquiry area 250. The user then initiates the search, for example by pressing enter on the keyboard 70 or by using the mouse 80 to select a screen "button" to start the search. The key words in the search enquiry box 250 are then compared with the information items in the database using a standard keyword search technique. This generates a list of results, each of which is shown as a respective entry 280 in the list view 260. Also, each result has a corresponding display point on the node display area 270.

Because the sorting process used to generate the SOM representation tends to group mutually similar information items together in the SOM, the results for the search enquiry generally tend to fall in clusters such as a cluster 290. Here, it is noted that each point on the area 270 corresponds to the respective entry in the SOM associated with one of the results in the result list 260; and the positions at which the points are displayed within the area 270 correspond to the array positions of those nodes within the node array.

Figure 8:
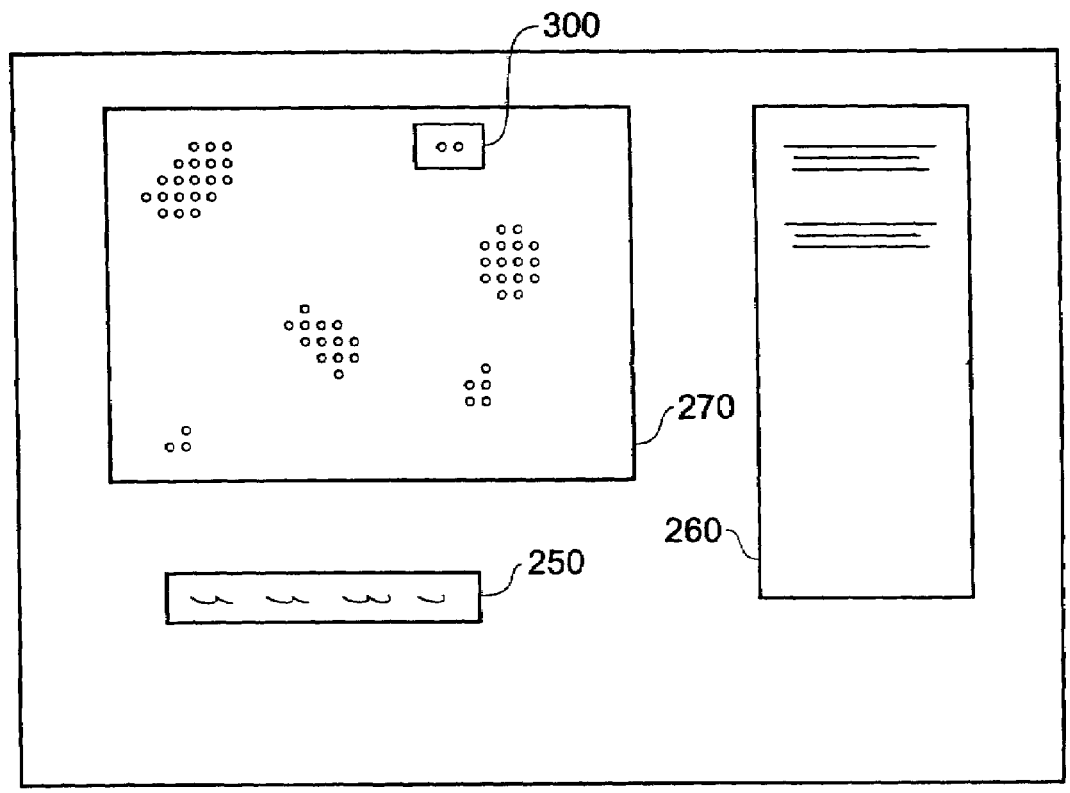

FIG. 8 schematically illustrates a technique for reducing the number of "hits" (results in the result list). The user makes use of the mouse 80 to draw a box 300 around a set of display points corresponding to nodes of interest. In the results list area 260, only those results corresponding to points within the box 300 are displayed. If these results turn out not to be of interest, the user may draw another box encompassing a different set of display points.

It is noted that the results area 260 displays list entries for those results for which display points are displayed within the box 300 and which satisfied the search criteria in the word search area 250. The box 300 may encompass other display positions corresponding to populated nodes in the node array, but if these did not satisfy the search criteria they will not be displayed and so will not form part of the subset of results shown in the box 260.

Figure 9:
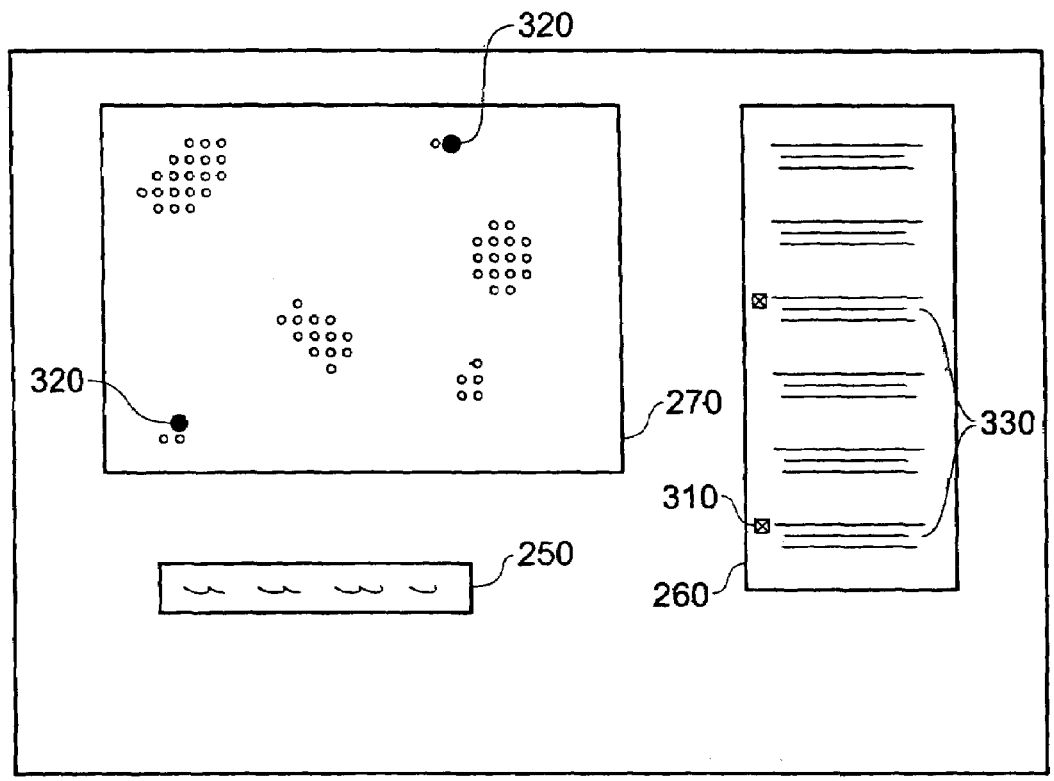

FIG. 9 schematically illustrates a technique for detecting the node position of an entry in the list view 260. Using a standard technique in the field of graphical user interfaces, particularly in computers using the so-called "Windows"™ operating system, the user may "select" one or more of the entries in the results list view. In the examples shown, this is done by a mouse click on a "check box" 310 associated with the relevant results. However, it could equally be done by clicking to highlight the whole result, or by double-clicking on the relevant result and so on. As a result is selected, the corresponding display point representing the respective node in the node array is displayed in a different manner. This is shown schematically for two display points 320 corresponding to the selected results 330 in the results area 260.

The change in appearance might be a display of the point in a larger size, or in a more intense version of the same display colour, or in a different display colour, or in a combination of these varying attributes.

At any time, a new information item can be added to the SOM by following the steps outlined above (i.e. steps 110 to 140) and then applying the resulting reduced feature vector to the "pre-trained" SOM models, that is to say, the set of SOM models which resulted from the self-organising preparation of the map. So, for the newly added information item, the map is not generally "retrained"; instead steps 150 and 160 are used with all of the SOM models not being amended. To retrain the SOM every time a new information item is to be added is computationally expensive and is also somewhat unfriendly to the user, who might grow used to the relative positions of commonly accessed information items in the map.

However, there may well come a point at which a retraining process is appropriate. For example, if new terms (perhaps new items of news, or a new technical field) have entered into the dictionary since the SOM was first generated, they may not map particularly well to the existing set of output nodes. This can be detected as an increase in a so-called. "quantisation error" detected during the mapping of newly received information item to the existing SOM. In the present embodiments, the quantisation error is compared to a threshold error amount. If it is greater than the threshold amount then either (a) the SOM is automatically retrained, using all of its original information items and any items added since its creation; or (b) the user is prompted to initiate a retraining process at a convenient time. The retraining process uses the feature vectors of all of the relevant information items and reapplies the steps 150 and 160 in full.

Figure 10:
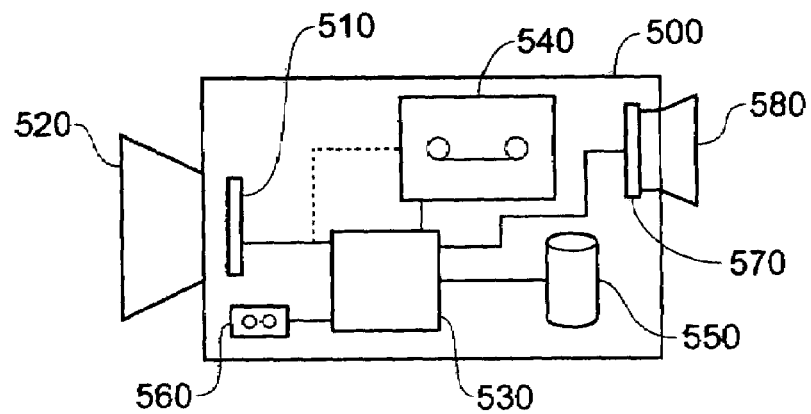
FIG. 10 schematically illustrates a camcorder as an example of a video acquisition and/or processing apparatus.

FIG. 10 schematically illustrates a camcorder 500 as an example of a video acquisition and/or processing apparatus, the camcorder including an image capture device 510 with an associated lens 520; a data/signal processor 530; tape storage 540; disk or other random access storage 550; user controls 560; and a display device 570 with eyepiece 580. Other features of conventional camcorders or other alternatives (such as different storage media or different display screen arrangements) will be apparent to the skilled man. In use, MetaData relating to captured video material may be stored on the storage 550, and an SOM relating to the stored data viewed on the display device 570 and controlled as described above using the user controls 560.

Figure 11:
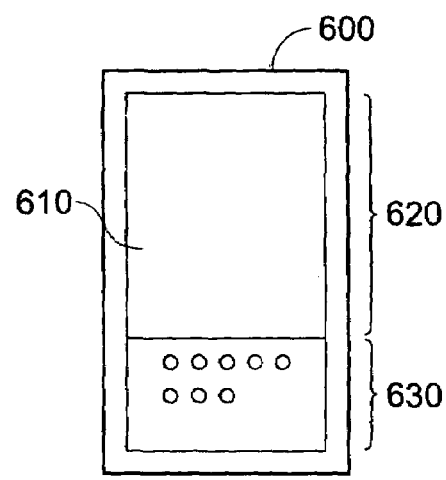
FIG. 11 schematically illustrates a personal digital assistant as an example of portable data processing apparatus

FIG. 11 schematically illustrates a personal digital assistant (PDA) 600, as an example of portable data processing apparatus, having a display screen 610 including a display area 620 and a touch sensitive area 630 providing user controls; along with data processing and storage (not shown). Again, the skilled man will be aware of alternatives in this field. The PDA may be used as described above in connection with the system of FIG. 1.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An information retrieval system in which information items map to respective nodes in an array of nodes by mutual similarity of said information items, so similar information items map to nodes at similar positions in said array of nodes to form a self-organizing map, said system comprising:
  (i) a processor;
  (ii) a graphical user interface configured to display a representation of nodes of the self-organizing map as a two-dimensional display array of display points within a display area on a user display;
  (iii) a user control configured to define a two-dimensional region of said display area;
  (iv) a detector configured to detect those display points lying within said two-dimensional region of said display area; and
  (v) a comparator configured to compute a quantization error of a newly received information item and comparing the quantization error to the self-organizing map, and configured to retrain the self-organizing map when the quantization error is above a predetermined threshold, wherein
  said graphical user interface is further configured to concurrently display a list of data representing information items, being those information items mapped onto said nodes corresponding to display points displayed within said two-dimensional region of said display area; and
  said graphical user interface is configured to provide a dither component so as to display nodes that have substantially identical or identical information items at different locations in a display area to visibly distinguish the nodes have substantially identical or identical information items, the dither component being a random addition to a node position of up to a half of a separation between adjacent nodes.

2. A system according to claim 1, in which said information items are mapped to nodes in said array on the basis of a feature vector derived from each information item.

3. A system according to claim 2, in which said feature vector for an information item represents a set of frequencies of occurrence, within that information item, of each of a group of information features.

4. A system according to claim 3, in which said information items comprise textual information, said feature vector for an information item represents a set of frequencies of occurrence, within that information item, of each of a group of words.

5. A system according to claim 4, in which said information items are preprocessed for mapping by excluding words occurring with more than a threshold frequency amongst said set of information items.

6. A system according to claim 4, in which said information items are preprocessed for mapping by excluding words occurring with less than a threshold frequency amongst said set of information items.

7. A system according to claim 4, comprising:
  (i) search logic configured to carry out a word-related search of said information items, wherein
  said search logic and said graphical user interface is arranged to co-operate so that only those display points corresponding to information items selected by said search are displayed.

8. A system according to claim 1, in which said information items comprise textual information, said nodes being mapped by mutual similarity of at least a part of said textual information.

9. A system according to claim 1, further comprising:
  a user control configured to choose one or more information items from said list,
  wherein said graphical user interface is further configured to alter said manner of display within said display area of display points corresponding to selected information items.

10. A system according to claim 9, in which said graphical user interface is operable to display in a different colour and/or intensity those display points corresponding to information items chosen within said list.

11. An information storage system in which information items are processed so as to map to respective nodes in an array of nodes by mutual similarity of the information items, such that similar information items map to nodes at similar positions in the array of nodes to form a self-organizing map, the system comprising:
  a processor;
  a generator configures to generate a feature vector derived from each information item of the self-organizing map, the feature vector for an information item representing a set of frequencies of occurrence, within that information item, of each of a group of information features;
  mapping logic configured to map each feature vector to a node in the self-organizing map, the mapping between information items and nodes in the array including a dither component configured to display nodes that have substantially identical or identical information items at different locations arising from an application of the dither component in a display area to visibly distinguish the nodes having substantially identical or identical information items;

logic configured to mare a newly received information item to a node in the array of nodes;

a mapping error detector configured to detect a mapping error as the newly received information items is so mapped; and logic, responsive to a detection that the mapping error exceeds a threshold error amount, configured to initiate a remapping process of the set of information items and the newly received information item, wherein the dither component is a random addition to a node position of up to a half of separation distance between adjacent nodes.

12. A portable data processing device comprising a system according to claim 1.

13. Video acquisition and/or processing apparatus comprising a system according to claim 1.

14. An information storage method in which information items are processed so as to map to respective nodes in an array of nodes by mutual similarity of the information items, such that similar information items map to nodes at similar positions in the array of nodes to form a self-organizing map, the method comprising:

generating a feature vector derived from each information item of the self-organizing map, the feature vector for an information item representing a set of frequencies of occurrence, within that information item, of each of a group of information features;

mapping each feature vector to a node in the self-organizing map, the mapping between information items and nodes in the array including a dither component configured to display nodes that have substantially identical or identical information items at different locations arising from an application of the dither component in a display area to visibly distinguish the nodes having substantially identical or identical information items;

mapping a newly received information item to a node in the array of nodes;

detecting a mapping error as the newly received information items is so mapped; and initiating a remapping process of the set of information items and the newly received information item logic, in response to a detection that the mapping error exceeds a threshold amount, wherein the dither component is a random addition to a node position of up to a half of separation distance between adjacent nodes.

15. An information retrieval method in which a set of distinct information items map to respective nodes in an array of nodes by mutual similarity of said information items, so similar information items map to nodes at similar positions in said array of nodes to form a self-organizing map, said method comprising:

(i) displaying a representation of at least some of said nodes of the self-organizing map as a two-dimensional display array of display points within a display area;

(ii) defining, with a user control, a two-dimensional region of said display area;

(iii) detecting those display points lying within said two-dimensional region of said display area;

(iv) displaying, concurrently with the representation of at least some of said nodes, a list of data representing information items, being those information items mapped onto said nodes corresponding to display points displayed within said two-dimensional region of said display area;

(v) computing a quantization error of a newly received information item, comparing the quantization error to the self-organizing map, retraining the self-organizing map when the quantization error is above a predetermined threshold; and (vi) applying a dither component so as to display nodes that have substantially identical or identical information items at different locations in a display area, to visibly distinguish the nodes have substantially identical or identical information items, the dither component being a random addition to a node position of to a half of a separation between adjacent nodes.

16. A computer readable storage medium having program code recorded thereon, the program code configured to carry out a method according to claim 14 when executed on a computer.

17. A computer readable storage medium having program code recorded thereon, the program code configured to carry out a method according to claim 15 when executed on a computer.

* * * * *